US005574082A

United States Patent [19]
Keller et al.

[11] Patent Number: 5,574,082
[45] Date of Patent: Nov. 12, 1996

[54] PROPYLENE POLYMER COMPOSITIONS HAVING IMPROVED COLOR AND STABILIZERS THEREFOR.

[75] Inventors: Douglas D. Keller, Cincinnati; Morgan L. Gibbs, Loveland, both of Ohio

[73] Assignee: Quantum Chemical Company, Cincinnati, Ohio

[21] Appl. No.: 450,097

[22] Filed: May 25, 1995

[51] Int. Cl.$^6$ .............................. C08K 5/15; C08K 5/09; C08K 5/10; C08K 5/12

[52] U.S. Cl. .......................... 524/110; 524/291; 524/317; 524/381; 524/386; 524/389; 524/400

[58] Field of Search ....................... 252/399, 407, 252/400.24; 524/110, 291, 317, 381, 386, 389, 400

[56] References Cited

U.S. PATENT DOCUMENTS

| | | | |
|---|---|---|---|
| 3,144,436 | 8/1965 | Greene et al. | 525/333.8 |
| 3,219,622 | 11/1965 | Luiciani et al. | 524/381 |
| 3,940,379 | 2/1976 | Castagna et al. | 525/387 |
| 4,013,773 | 3/1977 | Murakami et al. | 514/458 |
| 4,061,694 | 12/1977 | Castagna | 525/387 |
| 4,366,280 | 12/1982 | Yukawa | 524/291 |
| 4,375,531 | 3/1983 | Ross | 525/93 |
| 4,404,304 | 9/1983 | Horner et al. | 524/110 |
| 4,511,685 | 4/1985 | Nissen et al. | 529/110 |
| 4,699,780 | 10/1987 | Jennings et al. | 424/60 |
| 4,791,140 | 12/1988 | Fukasawa et al. | 514/845 |
| 4,912,156 | 3/1990 | Yagi et al. | 524/120 |
| 5,037,419 | 8/1991 | Valentine et al. | 604/408 |
| 5,063,264 | 11/1991 | Nakajima | 524/118 |
| 5,227,418 | 7/1993 | Mueller et al. | 524/120 |
| 5,306,502 | 4/1994 | Jaeger et al. | 424/443 |
| 5,308,549 | 5/1994 | Laermer et al. | 252/399 |
| 5,414,034 | 3/1995 | Enlow et al. | 524/120 |

OTHER PUBLICATIONS

Monks, R.: "Lactate Stabilizers Rescue Virgin & Regrind Polyolefins", *Plastics Technology* (May 1993), p. 33.

*European Plastics News*: "Antioxidant Mimics Nature" (Sep. 1993), p. 26.

Laermer, S. et al.: "Use of Biological Antioxidants as Polypropylene Stabilizers," *Rubber & Rubber Processing & Applications*, vol. 14, No. 4 (1990), pp. 235–239.

*Plastics Engineering*: "Additives: Post–Stabilizing Recycled PP During Processing," (Sep. 1991), p. 39–41.

Ross, J., et al: "An Improved Gas–Phase Polypropylene Process," *Ind. & Eng. Chem.*, vol. 24, No. 1, (Mar. 1985), pp. 149–154.

*Kirk–Othmer's Ency. of Chem. Tech.*, vol. 16, 3rd Ed.: "Olefin Polymers (Polypropylene)", pp. 453–467.

*Ency. of Poly. Sci. & Eng.*, vol. 13, (1988), pp. 464–530.

Dieckman, D., et al.: "Lactic Acid Derivatives as Neutralizers in Polyprophylene,"[PATCO Polymer Additives] presented at Polyolefins VIII, SPE Regional Tech. Conf., Feb. 22–24, 1993, pp. 1–31, Houston, TX.

Dieckman, D.: "Unique, High–Performance Acid Neutralizers for Polyolefins," [PATCO Polymer Additives ] presented at 2nd International Business Forum on Spec. Polyolefins, Sep. 23, 1992, pp. 1–14.

Dieckman, D., et al.: "The Restabilization of Recycled Polyolefins," [PATCO Polymer Additives] Presented at "Improving the Marketing of Recycled Plastics," SPE Regional Tech. Conf., Oct. 5–7, 1992, Atlanta, GA.

*Primary Examiner*—Kriellion S. Morgan
*Attorney, Agent, or Firm*—Gerald A. Baracka; William A. Heidrich

[57] ABSTRACT

Useful stabilizer combinations and propylene polymer compositions stabilized therewith having improved resistance to discoloration upon processing are provided. The stabilizer combinations of the invention are comprised of a mixture of calcium salts of stearic acid and lactic acid and a tocopherol-containing mixture consisting essentially of α-tocopherol, glycerin, polyethylene glycol having an average molecular weight of about 300 and glycerol monocaprylate. Propylene homopolymers and random, block and impact copolymers of propylene are stabilized in accordance with the invention.

11 Claims, No Drawings

PROPYLENE POLYMER COMPOSITIONS HAVING IMPROVED COLOR AND STABILIZERS THEREFOR.

BACKGROUND OF THE INVENTION

1. Field of the Invention

This invention relates to useful stabilizer compositions and to improved propylene polymer compositions stabilized therewith. The stabilized propylene homopolymers and copolymers have improved resistance to discoloration upon processing.

2. Description of the Prior Art

The sensitivity of propylene polymers to oxidative attack and the need to stabilize these polymers against degradation which can occur during processing and over the life of the polymer is well known. For example, when an unstabilized or insufficiently stabilized polypropylene or other high propylene content copolymer is processed, a significant increase in melt flow rate due to degradation, i.e., chain scission, of the polymer chain is observed. Processing stabilizers, such as sterically hindered phenols, phosphites, phosphonites and combinations thereof, are added to control this rise in melt flow rate.

Additionally, primary antioxidants or stabilizers are incorporated to impart long term stability to the manufactured product. The amount and type of stabilizer(s) used for this purpose depends on the conditions to which the product will be exposed and the desired service life. Sterically hindered phenols of medium to high molecular weight are used almost exclusively for this purpose, often in conjunction with synergists, such as thioethers. Phosphites added to provide stabilization during processing may also function as the primary antioxidant, i.e., impart long term post-processing stability, if utilized at sufficiently high levels.

The complete stabilizer package will also most often include one or more additional additives, such as ultraviolet absorbers, metal deactivators, acid neutralizers and catalyst deactivators. The addition of such compounds protect the propylene polymer against specific types of degradation and further improve retention of melt viscosity, color and physical properties. Calcium stearate, zinc stearate, lactic acid salts, i.e., lactates and lactylates, zinc oxide and synthetic hydrotalcites, are examples of additives commonly included in propylene polymer stabilizer packages.

Recently, biological antioxidants have also been suggested as useful polypropylene stabilizers. Vitamin E (dl-α-tocopherol) is commercially synthesized and has been suggested as a polypropylene stabilizer by itself and in combination with other hindered phenol primary antioxidants and/or secondary antioxidants.

By way of illustration, stabilizer combinations useful for propylene polymers are discussed in U.S. Pat. Nos. 3,219,622; 4,366,280; 4,912,156; 5,063,264 and 5,227,418. The latter reference, for example, utilizes a combination of tetrakis (methylene 3-(3,5-di-t-butyl-4-hydroxyphenyl)propionate) methane; bis (2,4-di-t-butylphenyl)pentaerythritol diphosphite and calcium lactate to stabilize stereoregular branched mono-1-olefin polymers, such as polypropylene.

Whereas effective protection against oxidative degradation of propylene polymers can be achieved with a variety of stabilizer packages, there is often a noticeable deterioration of color during processing. This discoloration, i.e., yellowing, even when slight, is undesirable in all instances and cannot be tolerated for certain critical use applications. The degree of discoloration of propylene polymers is generally determined by measuring the yellowiness index (YI) in accordance with ASTM D 1925. Stabilizer combinations which exhibit a reduced tendency to discolor propylene polymers are highly desirable and always in demand.

SUMMARY OF THE INVENTION

This invention provides improved stabilizers and propylene homopolymer and copolymer compositions stabilized therewith and having improved color upon processing. It is an object of the invention to provide a stabilizer package comprised of a combination of additives that provides improved resistance to thermal-oxidative degeneration during processing and over the life of the polymer. It is a further object to provide propylene polymer compositions stabilized with the improved additive combinations that have improved resistance to discoloration.

These and other objects are achieved with the stabilizer compositions of the present invention comprised of (a) a mixture of calcium salts of stearic and lactic acids and (b) a tocopherol-containing mixture consisting essentially of α-tocopherol, glycerin, polyethylene glycol having an average molecular weight of about 300 and glycerol monocaprylate. The weight ratio of calcium stearate to calcium lactate in (a) will range from 10:1 to 1:10.

The improved propylene polymer compositions contain (a) a propylene homopolymer or copolymer of propylene and a comonomer selected from the group consisting of ethylene and $C_{3-6}$ α-olefins; (b) 400–4000 ppm of a mixture of calcium salts of stearic and lactic acids and (c) 250 to 2500 ppm of a mixture consisting essentially of α-tocopherol, glycerin, polyethylene glycol having an average molecular weight of about 300 and glycerol monocaprylate. The stabilized polymers may also contain one or more conventional hindered phenols selected from the group consisting of octadecyl 3,5-di-t-butyl-4-hydroxydrocinnamate, tetrakis[methylene (3,5-di-t-butyl-4-hydroxyhydrocinnamate)]methane, thiodiethylene bis-(3,5-di-t-butyl-4-hydroxy)hydrocinnamate, and mixtures thereof. In yet another embodiment, a thioether synergist, such as dilauryl thiodipropionate or distearyl thiodipropionate, is also included as part of the stabilizer package.

DETAILED DESCRIPTION OF THE INVENTION

Propylene polymers stabilized in accordance with the present invention include propylene homopolymers and copolymers of propylene and one or more other olefinic comonomers selected from the group consisting of ethylene and $C_{4-6}$ α-olefins. Useful copolymers include random copolymers, block copolymers and the so-called impact copolymers—the latter produced either by reactor synthesis or by physical blending. All of the various homopolymers and copolymers are known and produced using conventional procedures. Propylene polymers of the above types are generally discussed in Volume 16 of *Kirk-Othmer's Encyclopedia of Chemical Technology*, 3rd Edition, pp 453–467 and in Volume 13 of *Encyclopedia of Polymer Science and Engineering*, 1988, pp 464–530.

The propylene homopolymers, i.e., polypropylenes, are crystalline, isotactic products of varying melt flow rate and physical properties. Crystallinity contents of the polypropylenes usually ranges from about 50 percent up to about 70 percent and, more typically, is in the range 55 to 65 percent.

The copolymers have propylene as the major constituent which means that the propylene content of the copolymer is greater than 50 percent by weight. Highly useful copolymers contain 70 percent by weight, or more, propylene and, in an even more preferred embodiment, the propylene is copolymerized with ethylene. Random copolymers of propylene and ethylene generally contain from 1 to 10 weight percent ethylene and, more preferably, from 1 to 5 weight percent ethylene. Block copolymers of propylene and ethylene generally contain from 5 to 25 weight percent ethylene and, more preferably, from 5 to 20 weight percent ethylene. Both the random and the block propylene-ethylene copolymers typically have crystallinity contents from about 45 to about 65 percent and, more preferably, from 50 to 65 percent. Small amounts of other polymerizable monomers may be included with the propylene and ethylene if desired.

Propylene impact copolymers are two phase materials consisting of a continuous phase of highly isotactic polypropylene and a dispersed phase of rubbery or rubber-like ethylene-propylene copolymer. Ethylene contents of these copolymers can range from about 10 up to as high as 30 weight percent and, more preferably, will be in the range from about 12 up to about 25 weight percent. While these impact copolymers can be produced by melt compounding, they can also be directly reactor synthesized. Existing multireactor technology makes it possible to directly produce impact copolymers products by polymerizing propylene in a first reactor and discharging the propylene homopolymer from the first reactor into a second reactor where propylene and ethylene are copolymerized in the presence of the polypropylene. Gas phase polymerizations of this type are described in the article by Ross, et al., "An Improved Gas-Phase Polypropylene Process," *Ind. Eng. Chem. Prod. Res. Dev.*, 1985;24, pp 149–154. This gas phase technology has also been extended to the production of products having higher rubber/elastomer contents and ethylene contents up to as high as 50 weight percent and these products are referred to as in-situ thermoplastic polyolefins (TPOs).

All of the foregoing propylene polymers may be used as such to produce the stabilized compositions of the invention or they may be visbroken prior to or during incorporation of the stabilizer components to increase their melt flow rate and improve processability. Visbreaking, commonly used to increase the melt flow rate of propylene polymers, is the controlled degradation of the polymer using either thermal or chemical means and numerous procedures are described in the prior art such as in U.S. Pat. Nos. 3,144,436; 3,940,379 and 4,061,694. Both methods involve working the polymer at an elevated temperature in a suitable mixer which imparts sheer. Single or twin screw extruders, Banbury mixers and the like are commonly used. The operations are typically carried out until the desired melt flow rate is achieved. In batch operations, for example, the operation will be carried out for a period of time sufficient to effect the desired melt flow rate increase. In continuous operations such as where extruders are used to bring about the visbreaking, residence times can be varied or multiple passes can be made.

Thermal visbreaking is generally carried out at temperatures in excess of about 550° F. in the absence of free radical initiators. For chemical visbreaking about 50 up to about 2000 ppm free radical initiator, such as a peroxide, hydroperoxide, azo or diazo compound, is included with the polymer. Chemical visbreaking is carried out at a temperature above the melt point of the polymer and above the decomposition temperature of the initiator, typically from about 350° F. to 550° F.

The improved additive compositions of the invention, also referred to herein as stabilizer combination or stabilizer package, are comprised of (a) a mixture of calcium salts of stearic acid and lactic acid and (b) a tocopherol-containing mixture consisting essentially of α-tocopherol, glycerin, and polyethylene glycol having an average molecular weight of about 300 and glycerol monocaprylate.

The mixture (a) will contain calcium stearate and calcium lactate at a weight ratio from about 10:1 to about 1:10 and, more preferably, from 4:1 to 1:4. About 400 to 4000 ppm of the mixture is utilized to effectively stabilize the propylene polymers. The amount of the mixture is more preferably in the range from about 500 to 3000 ppm. Ppm levels recited herein are based on the weight of the propylene homopolymer or propylene copolymer.

The calcium stearate and calcium lactate may be incorporated separately into the propylene polymer or they may be blended at the desired level prior to incorporation. Both calcium stearate and calcium lactate are commercially available. In a particularly useful embodiment, an overbased calcium lactate is used. Overbased calcium lactate is available from PATCO Polymer Additives Division of American Ingredients Company under the trademark PATIONIC 1240.

The tocopherol-containing mixture, also referred to herein as the tocopherol-based formulation, is commercially available from Industrial & Agricultural Products, Roche Vitamins and Fine Chemicals, a division of Hoffmann-LaRoche, Inc., under the trademark RONOTEC CF-120. This product contains about 20 weight percent α-tocopherol, about 20 weight percent glycerin, about 17 weight percent polyethylene glycol having an average molecular weight of about 300 (PEG-300), and about 43 weight percent glycerol monocaprylate. The tocopherol mixture is employed at levels of 250 to 2500 ppm and, most preferably, at levels in the range 500 to 2000 ppm.

Where the products are to be exposed to more severe service conditions, it may be desirable to include one or more sterically hindered phenols of the type commonly used as primary antioxidants. Hindered phenols of this type typically will contain one or more substituted phenyl groups of the formula

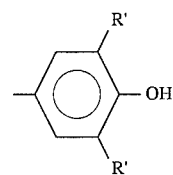

where R' is a $C_{1-4}$ alkyl group and, most preferably, a tertiary butyl group. The R' groups can be the same or different. Where, as in a preferred embodiment of the invention, more than one 3,5-dialkyl-4-hydroxyphenyl group is present, the groups will be joined through a linking group and the resulting compounds will correspond to the formula

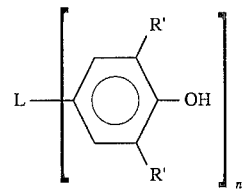

where n is an integer from 2 to 4 and L represents the linking moiety.

Representative linking radicals can include:

$-CH_2-$ (a)

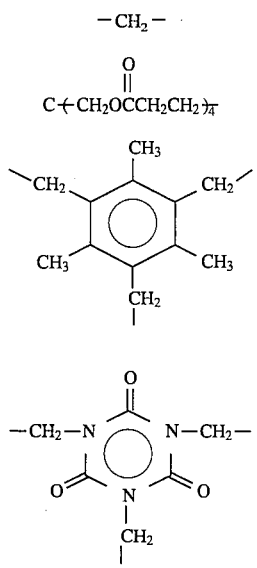

$C\text{-}(CH_2OCCH_2CH_2)_4$ with O double bond (b)

(c), (d) as shown $-CH_2CH_2-CNHNHC-CH_2CH_2-$ and (e)

$-CH_2CH_2COCH_2CH_2-S-CH_2CH_2OCCH_2CH_2-$. (f)

It is especially advantageous when 3,5-di-t-butyl-4-hydroxyphenyl groups or 3-t-butyl-5-methyl-4-hydroxyphenyl groups are linked via these linking moieties.

Representative phenols corresponding to the above formula include:

4,4'-Methylenebis(2,6-di-t-butylphenol);

Tetrakis[methylene(3,5-di-t-butyl-4-hydroxyhydrocinnamate)]methane;

1,3,5-Trimethyl-2,4,6-tris(3,5-di-t-butyl-4-hydroxybenzyl)benzene;

1,3,5-Tris(3,5-di-t-butyl-4-hydroxybenzyl)-s-triazine 2,4,6 (1H,3H,5H) trione;

N,N'-Bis[3-(3,5-di-t-butyl-4-hydroxyphenyl)propanyl]hydrazine;

Octadecyl 3,5-di-t-butyl-4-hydroxyhydrocinnamate; and

Thiodiethylenebis-(3,5-di-t-butyl-4-hydroxy)hydrocinnamate.

In a highly useful embodiment of the invention, a hindered phenol selected from the group consisting of octadecyl 3,5-di-t-butyl-4-hydroxydrocinnamate, tetrakis[methylene (3,5-di-t-butyl-4-hydroxyhydrocinnamate)]methane, thiodiethylene bis-(3,5-di-t-butyl-4-hydroxy)hydrocinnamate, and mixtures thereof is included with the mixed calcium slats and tocopherol-based formulation. All of the hindered phenols in the preferred group are commercially available. Octadecyl 3,5-di-t-butyl-4-hydroxyhydrocinnamate is available from Ciba-Geigy Corporation under the trademark IRGANOX 1076. Tetrakis[methylene(3,5-di-t-butyl-4-hydroxyhydrocinnamate)]methane is available from Ciba-Geigy Corporation under the trademark IRGANOX 1010. Thiodiethylene bis-(3,5-di-t-butyl-4-hydroxy) hydrocinnamate is available from Ciba-Geigy Corporation under the trademark IRGANOX 1035. When a hindered phenol is used with the mixture of calcium salts and tocopherol-containing mixture to stabilize the propylene polymer, it will be present in the polymer composition in an amount from about 150 to 2500 ppm and, more preferably, from about 300 to 1500 ppm.

Where severe service conditions of the propylene polymer are expected, such as when the composition is to be used for automotive under-the-hood applications, it is also advantageous to include a thioether synergist with the hindered phenol(s). Commonly used thioether synergists such as dilauryl thiodipropionate (DLTDP) and distearyl thiodipropionate (DSTDT), are commonly employed. When present, the thioether synergists are used in amounts ranging from about 500 to 5000 ppm and, more preferably, 1500 to 3000 ppm.

The following examples describe the invention in greater detail and are provided for illustrative purposes to enable those skilled in the art to practice the invention. They are not intended to limit the scope of the invention and numerous variations are possible. All parts and percentages in the examples are given on a weight basis unless otherwise indicated. Additive levels are in ppm based on the weight of the propylene polymer.

The following is a list of abbreviations for the various propylene polymers and additives used in the examples.

$PP_1$—Propylene homopolymer (20 MFR)
$P/E_1$—Propylene-ethylene random copolymer (2 MFR; 2.5% ethylene)
$P/E_2$—Propylene-ethylene impact copolymer (11 MFR; 7.5% ethylene)
$P/E_3$—Propylene-ethylene impact copolymer (5 MFR; 10.5% ethylene)
ATM—a mixture containing 20 wt. % α-tocopherol, 20 wt. % glycerin, 20 wt. % PEG300 and 43 wt. % glycerol monocaprylate; RONOTEC CF-120 available from Roche Vitamins and Fine Chemicals, a division of Hoffman-LaRoche, Inc.
BHT—Butylated hydroxy toluene
CaLac—Overbased calcium lactate; PATIONIC 1240 available from PATCO Polymer Additives, Division of American Ingredients Company
CaSt—Calcium stearate
DSTDP—Distearyl thiodipropionate
HPh—Tetrakis[methylene(3,5-di-t-butyl-4-hydroxyhydrocinnamate)]methane; IRGANOX 1010 available from Ciba-Geigy Corp.
Ht—Synthetic hydrotalcite
Phos—Bis(2,4-di-t-butylphenyl)pentaerythritol diphosphite containing 1% triisopropanolamine; ULTRANOX 626 available from G.E. Specialty Chemicals.

EXAMPLE I

To demonstrate the improved color obtained with the formulations of the invention a series of inventive compositions, identified as I(a)–I(e) were prepared using polypropylene homopolymer, propylene-ethylene impact copolymer and propylene-ethylene random copolymer. The products were formulated by melt blending reactor powders, i.e., resin powder obtained directly from the polymerizer, with the additives. The additives and additive levels are specified in Table I. In one case the additives were added to the resin powder and the mixture melt blended and pelletized using a Prodex single screw extruder maintained at 210° C. (melt temperature) and equipped with a strand die. Melt flow rate (MFR) and yellowness index (YI) were determined on the pellets using ASTM D 1238 and ASTM D 1925, respectively. Forty mil plaques were also molded from the compositions using a Battenreid 230 E injection molder per ASTM D 4101-92B and the plaques evaluated for yellowness index (ASTM D 1925), haze (ASTM D 1003) and gloss (ASTM D 2457). Results are set forth in Table I except in those instances noted "N.D." where the value was not determined. For comparative purposes, each of the propylene polymers were also formulated using a conventional stabilizer system comprising a hindered phenol, phosphite, calcium stearate and synthetic hydrotalcite. Results obtained for these comparative compositions, identified as Comp. A–C, are also reported in Table I. In all instances where YI values were determined for the pellets and/or plaques, there was less discoloration with the formulations of the invention compared to the controls formulated with the conventional stabilizer package.

demonstrate the need to use a mixture of calcium salts of stearic and lactic acid, the following example is provided. For the example a composition, identified as III, containing 500 ppm CaSt, 500 ppm CaLac, 1000 ppm ATM and a comparative formulation, identified as Comp. D, were prepared in accordance with the procedure of Example I. For Comp. D, the CaLac was replaced with 500 ppm Ht. Melt flow rate and yellowness index were run on pellets and haze and gloss were determined using injection molded 40 mil plaques. Results were as follows:

TABLE I

|  | I(a) | I(b) | I(c) | I(d) | I(e) | COMP. A | COMP. B | COMP. C |
|---|---|---|---|---|---|---|---|---|
| Propylene Polymer | PP$_1$ | P/E$_1$ | P/E$_2$ | PP$_1$ | P/E$_2$ | PP$_1$ | P/E$_1$ | P/E$_2$ |
| CaSt | 500 | 500 | 500 | 500 | 500 | 500 | 500 | 500 |
| CaLac | 200 | 200 | 200 | 200 | 200 | — | — | — |
| ATM | 1000 | 1000 | 1000 | 500 | 500 | — | — | — |
| HPh | — | — | — | 500 | 500 | 300 | 300 | 300 |
| Phos | — | — | — | — | — | 500 | 500 | 500 |
| Ht | — | — | — | — | — | 200 | 200 | 200 |
| MFR (dg/min) | 15.9 | 1.64 | 11.8 | 16.1 | 12.0 | 14.7 | 1.22 | 10.4 |
| YI (pellet) | 4.69 | 3.05 | 3.78 | 5.32 | 2.86 | 9.14 | 4.82 | 7.14 |
| YI (plaque) | −1.02 | N.D. | −3.00 | −0.68 | −3.04 | −0.46 | N.D. | −2.43 |
| Haze (%) | >30 | 22 | N.D. | >30 | N.D. | >30 | 21 | N.D. |
| Gloss | 67 | 76 | N.D. | 66 | N.D. | 64 | 76 | N.D. |

EXAMPLE II

To demonstrate the improvement in color obtained after multiple pass extrusions with the products of the invention and the ability to include other stabilizer additives in the formulations, the following experiment was conducted using an ethylene-propylene impact copolymer. Two formulations, identified as II(a) and II(b), were prepared by melt blending the propylene copolymer and additives using a 1 inch single screw Killion extruder maintained at 210° C. (melt temperature). A sample of the pelletized product obtained after the first extrusion pass was collected and evaluated for melt flow rate and yellowness index. The remainder of the product was then subjected to two more passes through the extruder and the resulting extrudate, referred to as the third pass product, was also evaluated for MFR and YI. Results are set forth in Table II for II(a) and II(b) along with results obtained when a comparative formulation (Comp. B) was identically processed. The data clearly show the reduced color, i.e., lower YI values, obtained with the products of the invention versus the conventionally stabilized control.

TABLE II

|  | II(a) | II(b) | COMP. B |
|---|---|---|---|
| Propylene Polymer | P/E$_3$ | P/E$_3$ | P/E$_3$ |
| CaSt | 500 | 500 | 500 |
| CaLac | 500 | 500 | — |
| ATM | 1500 | 1500 | — |
| HPh | 1500 | 1500 | 1000 |
| BHT | — | — | 1000 |
| Ht | — | — | 500 |
| DSTDP | — | 2500 | 2500 |
| MFR (dg/min/1st pass) | 5.32 | 5.47 | 5.56 |
| YI (1st pass) | 6.60 | 5.86 | 7.9 |
| MFR (dg/min/3rd pass) | 5.56 | 5.54 | 5.88 |
| YI (3rd pass) | 9.80 | 8.22 | 10.65 |

EXAMPLE III

To further illustrate the reduction in discoloration obtained with the compositions of the invention and to

|  | III | COMP. D |
|---|---|---|
| MFR (dg/min) | 1.64 | 1.60 |
| YI | 3.05 | 12.62 |
| Haze (%) | 22.0 | 21.0 |
| Gloss | 76 | 74 |

The significant reduction in yellowness index obtained using a combination of calcium stearate and calcium lactate with the tocopherol-containing mixture is apparent from the above data.

We claim:

1. An improved propylene polymer composition having increased resistance to discoloration consisting essentially of:

(a) a propylene homopolymer or copolymer of propylene and a comonomer selected from the group consisting of ethylene and $C_{3-6}$ α-olefins;

(b) 400 to 4000 ppm of a mixture of calcium salts of steafic and lactic acids, the weight ratio of calcium stearate to calcium lactate ranging from 10:1 to 1:10; and (c) 250 to 2500 ppm of a mixture consisting essentially of α-tocopherol, glycerin, polyethylene glycol having an average molecular weight of about 300 and glycerol monocaprylate; said composition being substantially free of phosphites and phosphonites.

2. The composition of claim 1 wherein (a) is a semi-crystalline, isotactic propylene homopolymer having a crystallinity content of 50 to 70 percent.

3. The composition of claim 1 wherein (a) is a propylene copolymer containing greater than 50 weight percent propylene and selected from the group consisting of block copolymers, impact copolymers and random copolymers.

4. The composition of claim 3 wherein the copolymer is a copolymer of propylene and ethylene and the propylene content is 70 weight percent or greater.

5. The composition of claim 4 wherein the copolymer is a block copolymer of propylene and ethylene containing from 5 to 25 weight percent ethylene.

6. The composition of claim 4 wherein the copolymer is an impact copolymer of propylene and ethylene containing 10 to 30 weight percent ethylene.

7. The composition of claim 4 wherein the copolymer is a random copolymer of propylene and ethylene containing 1 to 10 weight percent ethylene.

8. The composition of claim 1 containing 500 to 3000 ppm (b) wherein the weight ratio of calcium stearate to calcium lactate is from 4:1 to 1:4 and 500 to 2000 ppm (c) containing about 20 weight percent α-tocopherol, about 20 weight percent glycerin, about 17 weight percent polyethylene glycol, and about 43 weight percent glycerol monocaprylate.

9. The composition of claim 8 additionally contains from 150 to 2500 ppm hindered phenol selected from the group consisting of octadecyl 3,5-di-t-butyl-4-hydroxydrocinnamate, tetrakis [methylene(3,5-di-t-butyl-4-hydroxyhydrocinnamate)]methane, thiodiethylene bis-(3,5-di-t-butyl-4-hydroxy)hydrocinnamate, and mixtures thereof.

10. The composition of claim 9 which additionally contains from 500 to 5000 ppm thioether synergist selected from the group consisting of dilauryl thiodipropionate and distearyl thiodipropionate.

11. The composition of claim 10 wherein the hindered phenol is tetrakis[methylene(3,5-di-t-butyl-4-hydroxyhydrocinnamate)]methane.

* * * * *